United States Patent
Islam et al.

(10) Patent No.: US 10,736,077 B2
(45) Date of Patent: Aug. 4, 2020

(54) CONFIGURATION OF REMAINING SYSTEM INFORMATION TRANSMISSION WINDOW

(71) Applicant: QUALCOMM Incorporated, San Diego, CA (US)

(72) Inventors: Muhammad Nazmul Islam, Edison, NJ (US); Bilal Sadiq, Basking Ridge, NJ (US); Sundar Subramanian, San Diego, CA (US); Navid Abedini, Raritan, NJ (US); Haitong Sun, Cupertino, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/970,524

(22) Filed: May 3, 2018

(65) Prior Publication Data

US 2018/0324753 A1    Nov. 8, 2018

Related U.S. Application Data

(60) Provisional application No. 62/588,831, filed on Nov. 20, 2017, provisional application No. 62/502,589, filed on May 5, 2017.

(51) Int. Cl.
*H04W 68/02* (2009.01)
*H04W 56/00* (2009.01)
(Continued)

(52) U.S. Cl.
CPC ......... *H04W 68/02* (2013.01); *H04W 48/12* (2013.01); *H04W 48/14* (2013.01);
(Continued)

(58) Field of Classification Search
CPC ... H04W 68/02; H04W 72/14; H04W 72/042; H04W 56/001; H04W 76/02
See application file for complete search history.

(56) References Cited

U.S. PATENT DOCUMENTS

| 10,057,906 B2 * | 8/2018 | Ko ................. H04B 17/24 |
| 2002/0093920 A1 * | 7/2002 | Neufeld ........... H04B 1/70756 370/311 |

(Continued)

OTHER PUBLICATIONS

"3rd Generation Partnership Project; Technical Specification Group Radio Access Network; Study on New Radio Access Technology Physical Layer Aspects (Release 14)", 3GPP Standard; Technical Report; 3GPP TR 38.802, 3rd Generation Partnership Project (3GPP), Mobile Competence Centre; 650, Route des Lucioles; F-06921 Sophia-Antipolis Cedex; France, vol. RAN WG1, No. V14.0.0, Mar. 25, 2017, pp. 1-143, XP051297632, [retrieved on Mar. 25, 2017].

(Continued)

*Primary Examiner* — Minjung Kim
(74) *Attorney, Agent, or Firm* — Kevin M. Donnelly; Patterson & Sheridan, L.L.P.

(57) ABSTRACT

Certain aspects of the present disclosure provide techniques for conveying information regarding a window for system information transmissions. Certain aspects of the present disclosure provide techniques for conveying information regarding a window for transmitting paging downlink control information (DCI) or paging messages.

49 Claims, 16 Drawing Sheets

(51) Int. Cl.
*H04W 72/14* (2009.01)
*H04W 72/04* (2009.01)
*H04W 48/12* (2009.01)
*H04W 48/14* (2009.01)
*H04W 76/27* (2018.01)

(52) U.S. Cl.
CPC ....... *H04W 56/001* (2013.01); *H04W 68/025* (2013.01); *H04W 72/042* (2013.01); *H04W 72/14* (2013.01); *H04W 76/27* (2018.02)

(56) References Cited

U.S. PATENT DOCUMENTS

| | | | | |
|---|---|---|---|---|
| 2012/0122495 | A1* | 5/2012 | Weng | H04W 68/025 |
| | | | | 455/458 |
| 2016/0119895 | A1* | 4/2016 | Agiwal | H04B 7/0408 |
| | | | | 455/458 |
| 2016/0234735 | A1 | 8/2016 | Kubota et al. | |
| 2017/0257842 | A1* | 9/2017 | Hessler | H04W 56/00 |
| 2018/0084593 | A1* | 3/2018 | Chen | H04W 76/11 |
| 2018/0176065 | A1* | 6/2018 | Deng | H04B 7/0695 |
| 2018/0192383 | A1* | 7/2018 | Nam | H04W 56/001 |
| 2018/0227973 | A1* | 8/2018 | Tsuboi | H04W 8/00 |
| 2018/0279240 | A1* | 9/2018 | Sheng | H04W 56/001 |

OTHER PUBLICATIONS

Ericsson: "Acquisition of Minimum SI", 3GPP Draft; R2-1700477—Acquisition of Minimum SI, 3rd Generation Partnership Project (3GPP), Mobile Competence Centre; 650, Route des Lucioles; F-06921 Sophia-Antipolis Cedex; France, vol. RAN WG2, No. Spokane, USA; Jan. 17, 2017-Jan. 19, 2017 Jan. 17, 2017, XP051211049, Retrieved from the Internet: URL:http://www.3gpp.org/ftp/Meetings_3GPP_SYNC/RAN2/Docs/ [retrieved on Jan. 17, 2017], 8 pages.

International Search Report and Written Opinion—PCT/US2018/031191—ISA/EPO—Jun. 28, 2018.

Nokia et al., "On Remaining System Information Delivery", 3GPP Draft; R1-1705841, 3rd Generation Partnership Project (3GPP), Mobile Competence Centre; 650, Route des Lucioles; F-06921 Sophia-Antipolis Cedex; France, vol. RAN WG1, No. Spokane, WA, USA; Apr. 3, 2017-Apr. 7, 2017, Apr. 2, 2017, XP051243953, Retrieved from the Internet: URL:http://www.3gpp.org/ftp/Meetings_3GPP_SYNC/RAN1/Docs/ [retrieved on Apr. 2, 2017], 5 pages.

* cited by examiner

CONFIGURATION OF REMAINING SYSTEM INFORMATION TRANSMISSION WINDOW

CLAIM OF PRIORITY UNDER 35 U.S.C. § 119

The present application for patent claims benefit of U.S. Provisional Patent Application Ser. No. 62/502,589, filed May 5, 2017 and U.S. Provisional Patent Application Ser. No. 62/588,831, filed Nov. 20, 2017, both assigned to the assignee hereof and hereby expressly incorporated by reference herein.

INTRODUCTION

Aspects of the present disclosure relate to wireless communications, and more particularly, to conveying to a user equipment (UE) a remaining window for system information transmissions.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (or other such network entities), each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Aspects of the present disclosure provide a method for wireless communications by a user equipment (UE). The method generally includes obtaining information regarding configuration of one or more windows corresponding to one or more synchronization signal (SS) blocks for transmission of system information (SI) grant and monitoring for one or more SI grant transmissions within the one or more windows in accordance with the information.

Aspects of the present disclosure provide a method for wireless communications by a network entity (e.g., a base station). The method generally includes transmitting information regarding configuration of one or more windows corresponding to one or more synchronization signal (SS) blocks for transmission of system information (SI) and sending one or more SI transmissions within the one or more windows in accordance with the information.

Aspects of the present disclosure provide a method for wireless communications by a user equipment (UE). The method generally includes obtaining information regarding configuration of one or more windows corresponding to one or more synchronization signal (SS) blocks for transmission of paging downlink control information (DCI) and monitoring for one or more paging DCI within the one or more windows in accordance with the information.

Aspects of the present disclosure provide a method for wireless communications by a network entity (e.g., a base station). The method generally includes transmitting information regarding configuration of one or more windows for transmission of paging downlink control information (DCI) and sending one or more one or more paging DCI within the window in accordance with the information.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
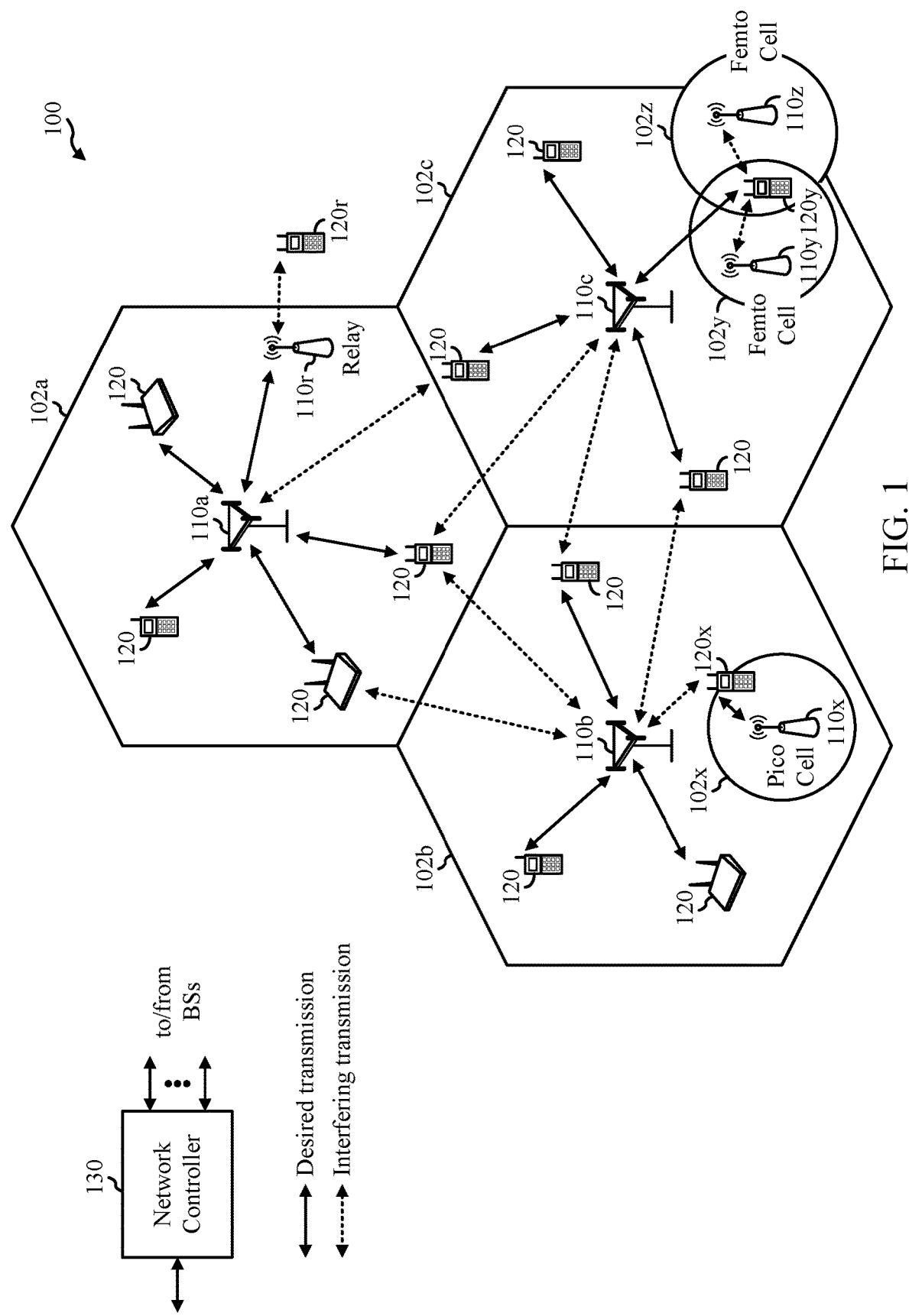
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network. NR wireless communication systems may employ beams, where a BS and UE communicate via active beams.

For illustrative purposes, aspects are described with reference to a primary BS and a secondary BS, wherein the secondary BS operates in an mmWave frequency spectrum and the primary BS operations in a lower frequency spectrum that the secondary spectrum; however, aspects may not be limited to this example scenario.

Figure 8:
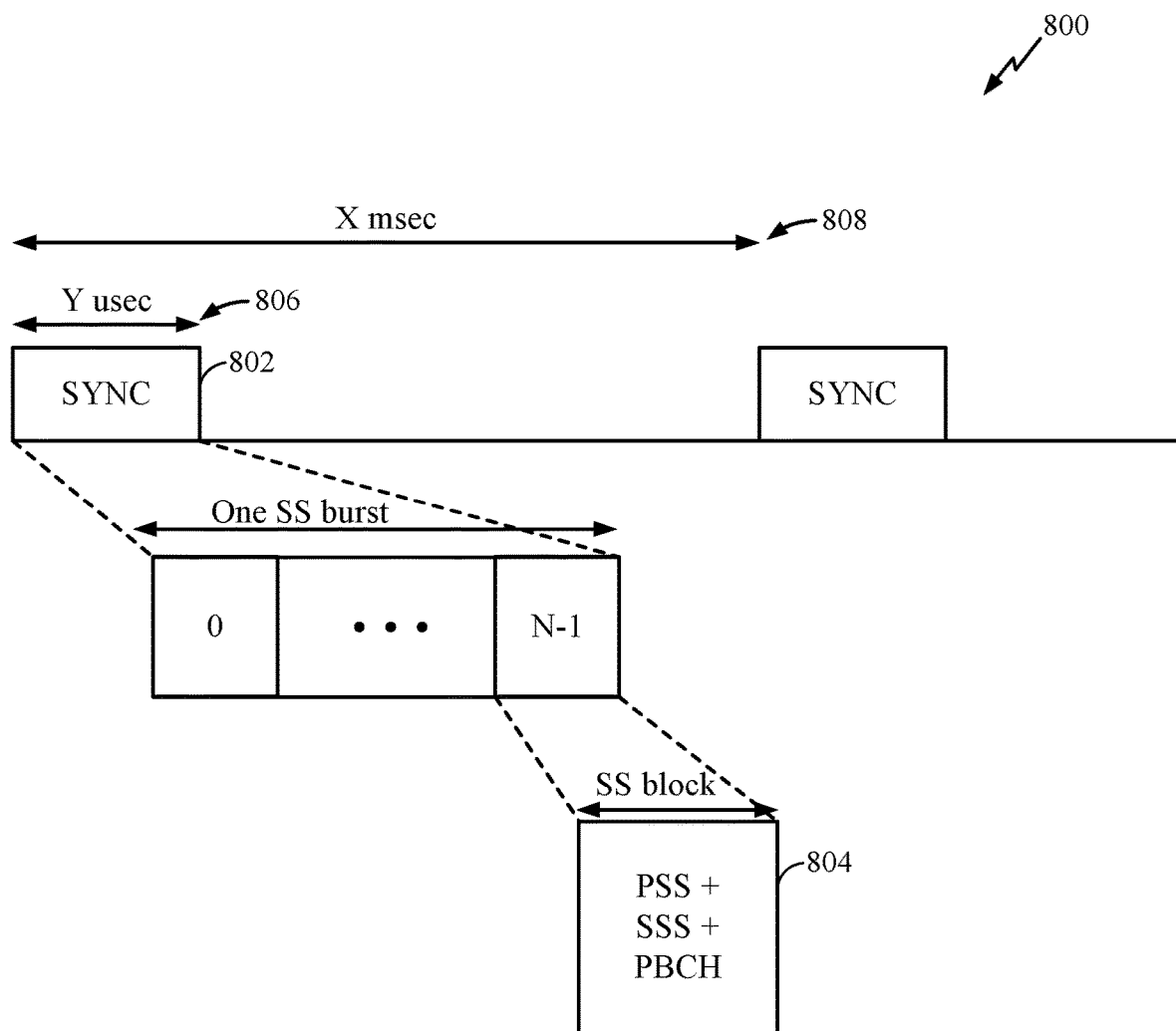
FIG. 8 example transmission timeline of synchronization signals for a new radio telecommunications system, in accordance with aspects of the present disclosure.

As described herein, for example, with respect to FIG. 8, a UE's initial access to a BS communicating via beams may be simplified with assistance from a BS operating in a lower frequency spectrum. With the assistance of the BS operating in a lower frequency spectrum, mmWave resources may be conserved and, in certain scenarios, initial synchronization to the mmWave network may completely or partly be bypassed.

UEs 120 may be configured to perform the operations 900 and methods described herein for determining a transmit power. BS 110 may comprise a transmission reception point (TRP), Node B (NB), 5G NB, access point (AP), new radio (NR) BS, Master BS, primary BS, etc.). The NR network 100 may include the central unit. The BS 110 may perform the operations 1000 and other methods described herein for providing assistance to a UE in determining a transmit power to use during a RACH procedure with another BS (e.g., a secondary BS).

A UE 120 may determine a transmit power for transmitting a message during a RACH procedure with a secondary BS, based at least in part, on communication between the UE and a primary BS. The UE may transmit the message to the secondary BS during the RACH procedure based, at least in part, on the determined transmit power.

A BS 110, such as a master BS or a primary BS, may communicate with the UE and may take one or more actions to assist the UE in setting a transmit power for transmitting a message during the RACH procedure with a secondary BS.

As illustrated in FIG. 1, the wireless network 100 may include a number of BSs 110 and other network entities. According to one example, the network entities including the BS and UEs may communicate on high frequencies (e.g., >6 GHz) using beams. One or more BS may also communicate at a lower frequency (e.g., <6 GHz). The one or more BS configured to operate in a high frequency spectrum and the one or more BS configured to operate in a lower frequency spectrum may be co-located.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
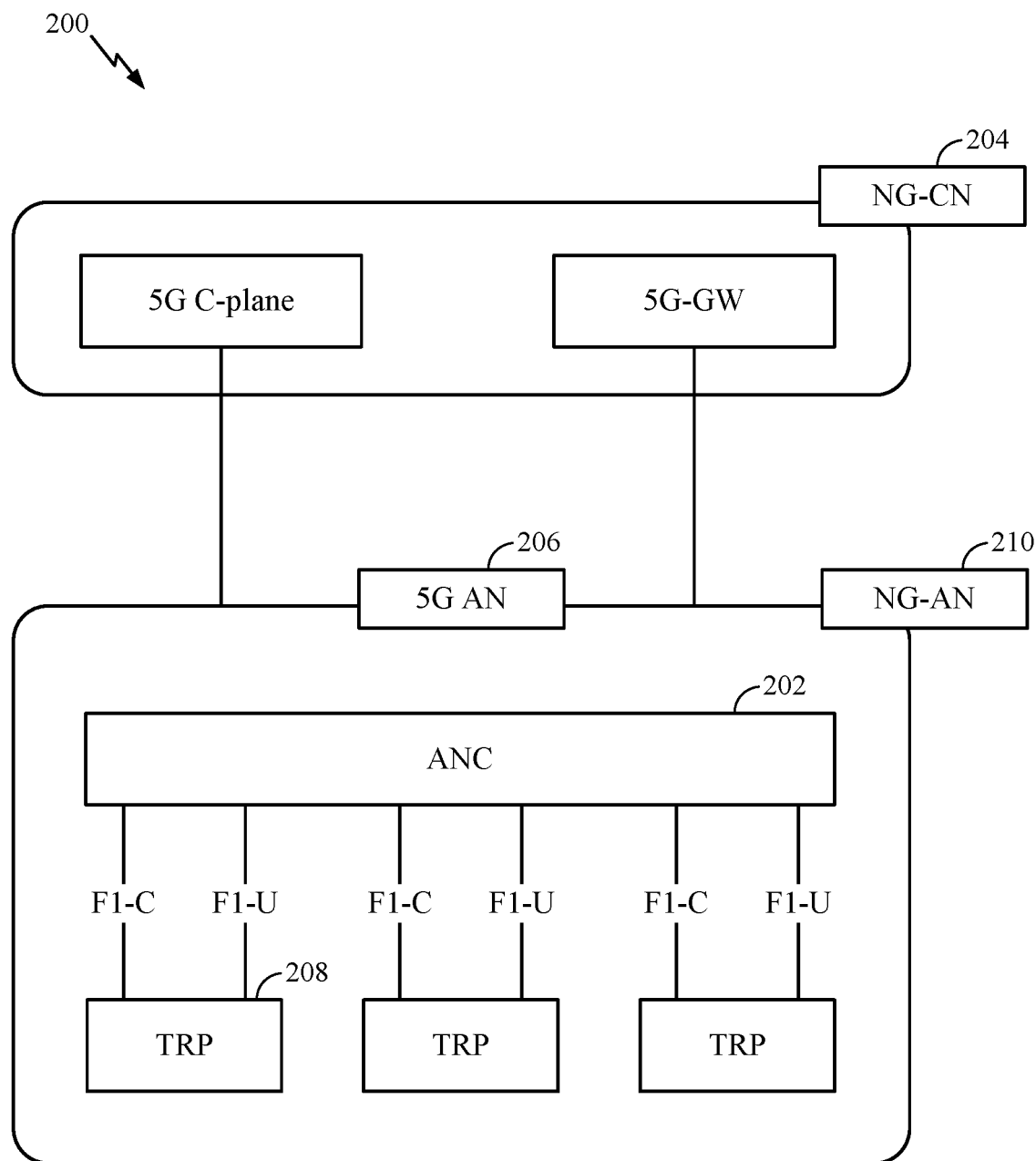
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
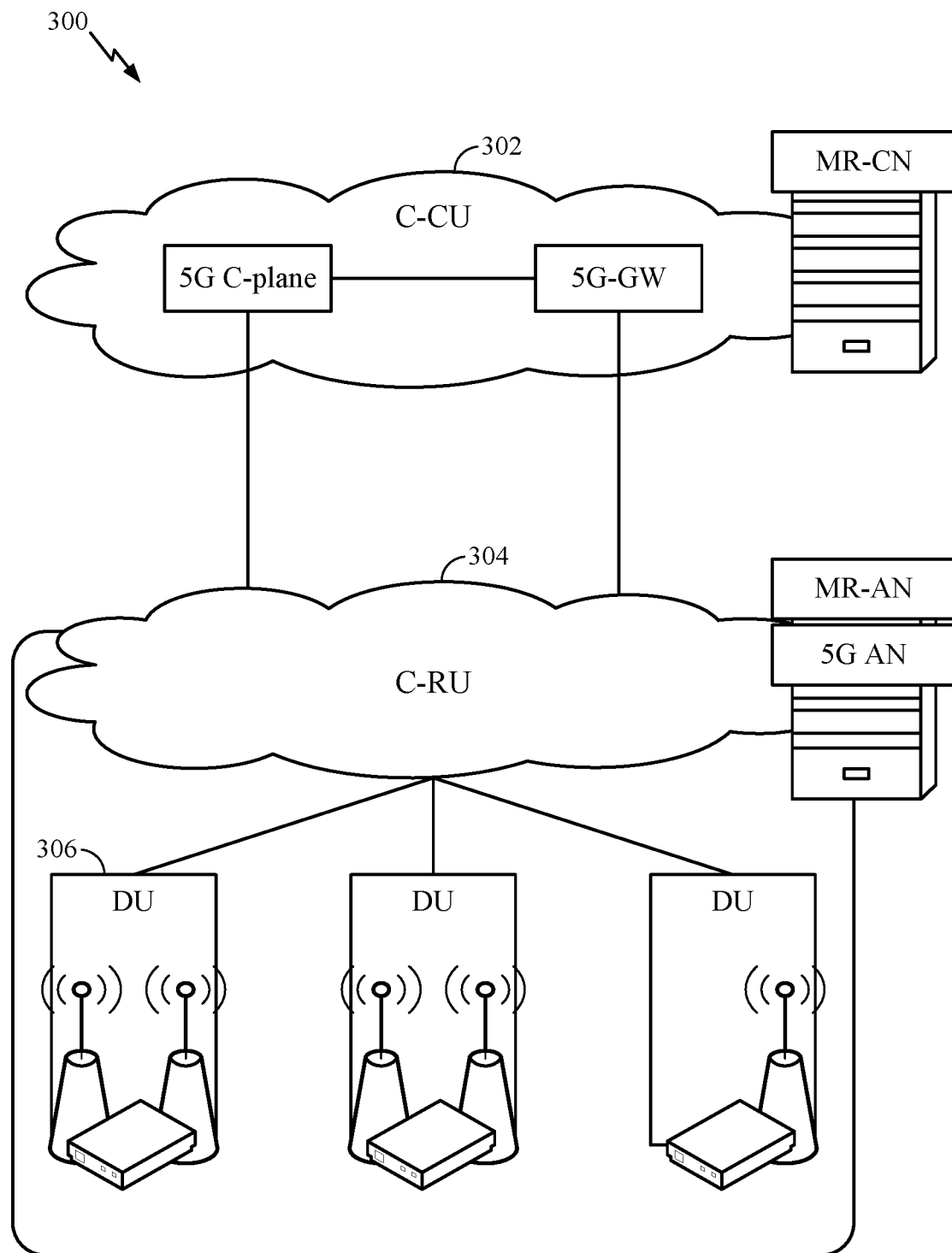
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
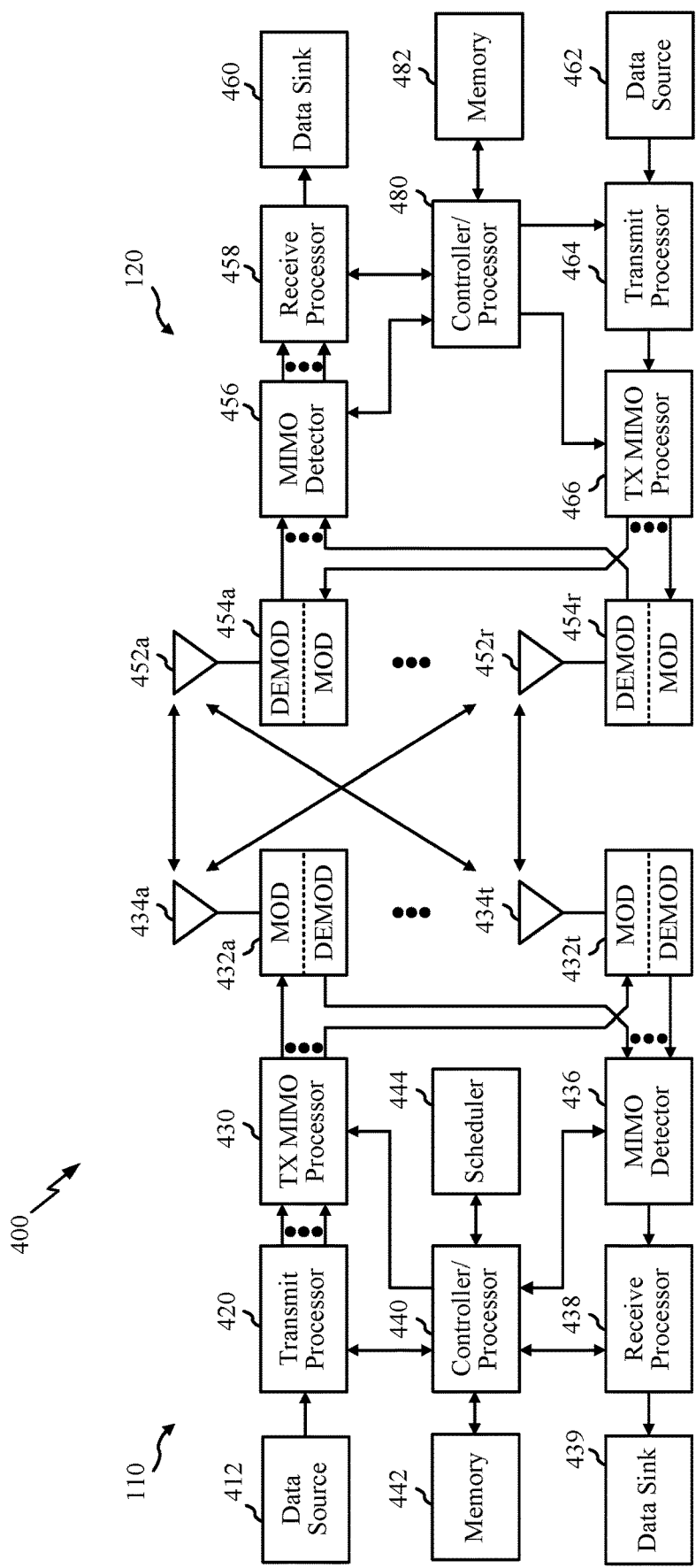
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP and may be referred to as a Master eNB (MeNB) (e.g., Master BS, primary BS). According to aspects, the Master BS may operate at lower frequencies, for example, below 6 GHz and a Secondary BS may operate at higher frequencies, for example, mmWave frequencies above 6 GHz. The Master BS and the Secondary BS may be geographically co-located.

One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 420, 430, 438, and/or controller/processor 440 of the BS 110 may be used to perform the operations described herein and illustrated with reference to FIGS. 9-10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent to the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 9, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
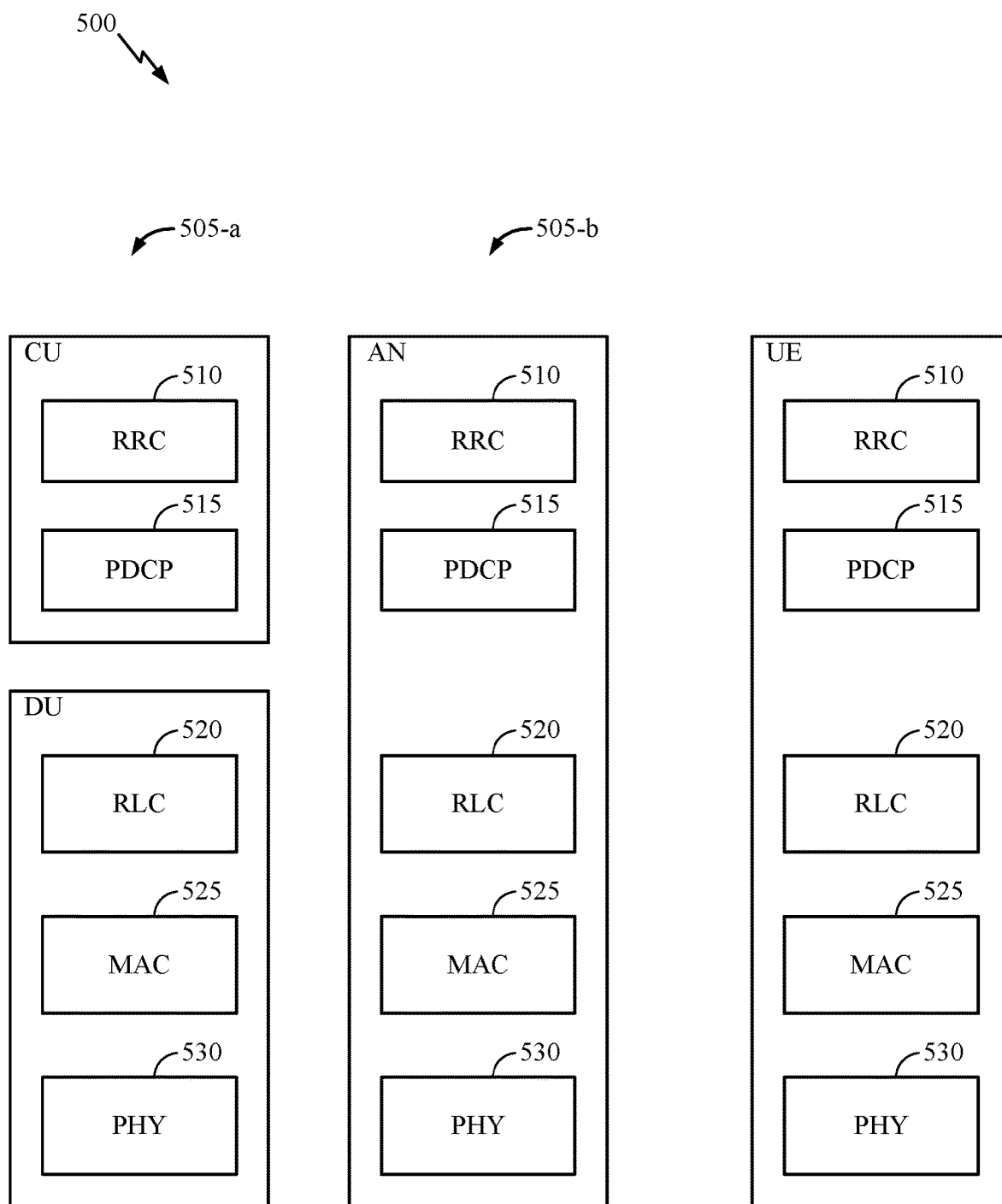
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
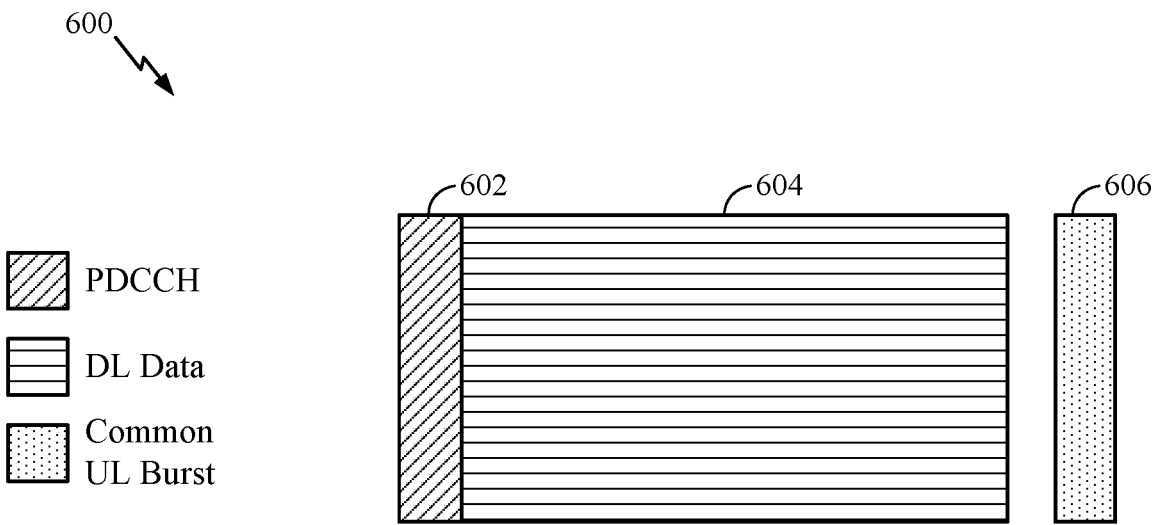
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
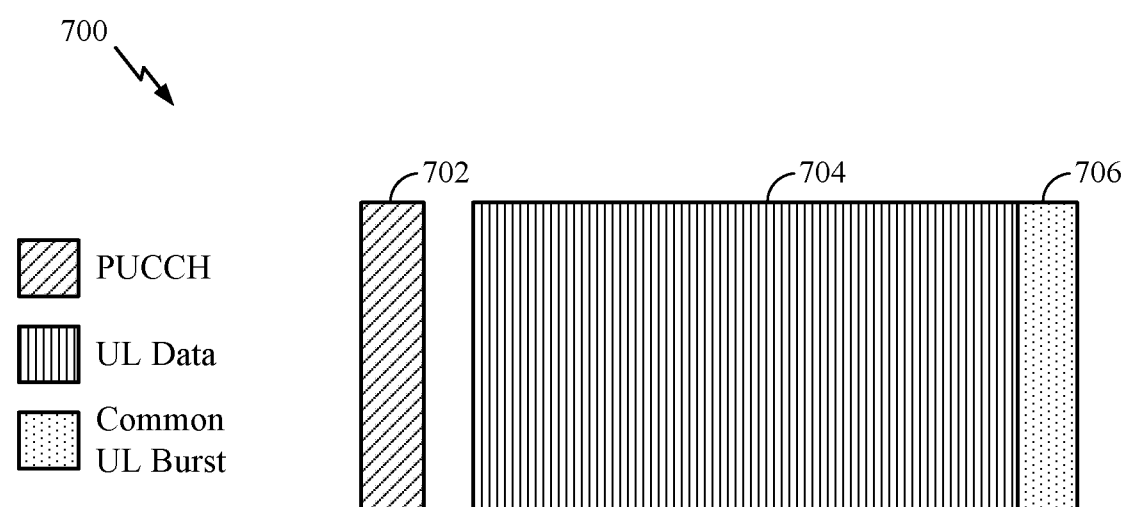
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical UL control channel (PUCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Synchronization Signal Block Design

Under 3GPP's 5G wireless communication standards, a structure has been defined for NR synchronization (synch) signals (NR-SS), also referred to as NR synchronization channels. Under 5G, a set of consecutive OFDM symbols carrying different types of synch signals (e.g., primary synchronization signal (PSS), secondary synchronization signal (SSS), time synchronization signal (TSS), PBCH) forms an SS block. In some cases, a set of one or more SS blocks may form an SS burst. In addition, different SS blocks may be transmitted on different beams to achieve beam-sweeping for synch signals, which may be used by a UE to quickly identify and acquire a cell. Further, one or more of the channels in an SS block may be used for measurements. Such measurements may be used for various purposes such as radio link management (RLM), beam management, etc. For example, a UE may measure the cell quality and report the quality back in the form of a measurement report, which may be used by the base station for beam management and other purposes.

FIG. 8 illustrates an example transmission timeline 800 of synchronization signals for a new radio telecommunications system, in accordance with aspects of the present disclosure. A BS, such as BS 110 shown in FIG. 1, may transmit an SS burst 802 during a period 806 of Y μsec, in accordance with certain aspects of the present disclosure. Operations 800 begin, at 802, by transmitting a synchronization signal (SS) burst. The SS burst may include N SS blocks 804 with indices of zero to N−1, and the BS may transmit different SS blocks of the burst using different transmit beams (e.g., for beam-sweeping). Each SS block may include, for example, a primary synchronization signal (PSS), a secondary synchronization signal (SSS), and one or more physical broadcast channels (PBCHs), also referred to as synchronization channels. The BS may transmit SS bursts on a periodic basis, with a period 808 of X msec.

Figure 9:
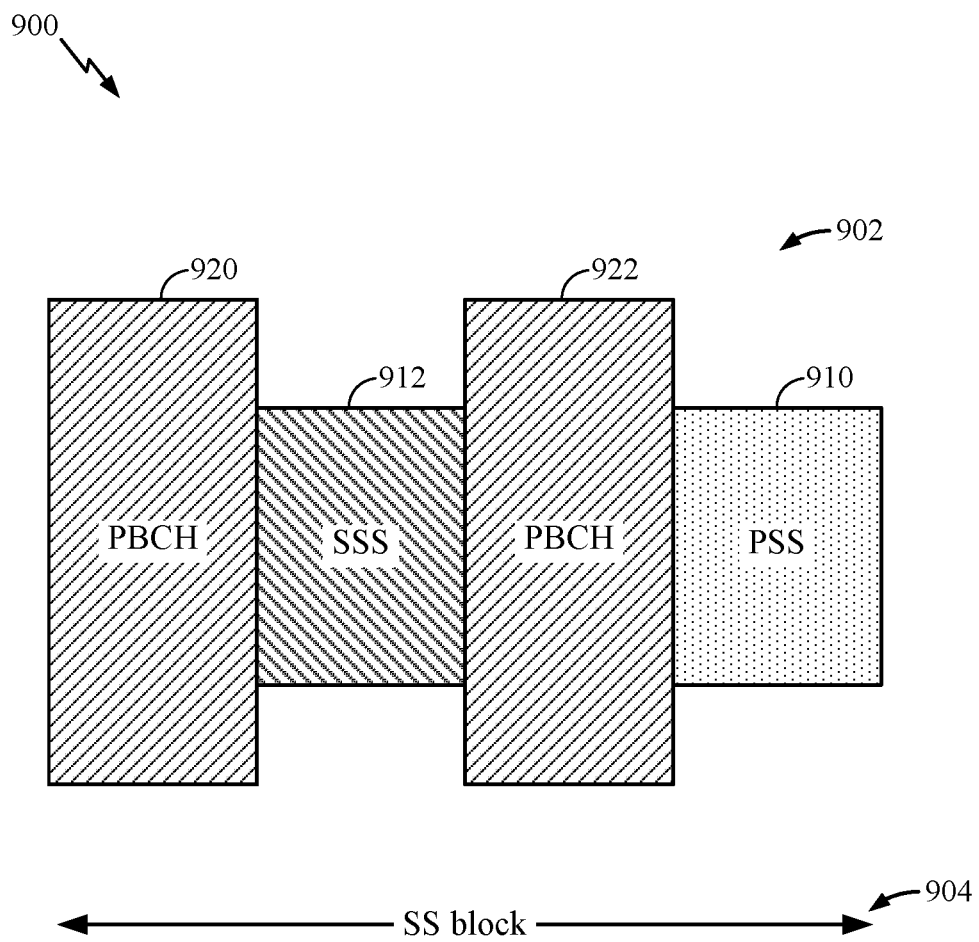
FIG. 9 illustrates an example resource mapping for an exemplary SS block, in accordance with aspects of the present disclosure.

FIG. 9 illustrates an example resource mapping 900 for an exemplary SS block 902, in accordance with aspects of the present disclosure. The exemplary SS block may be transmitted by a BS, such as BS 110 in FIG. 1, over a period 904 (e.g., Y μsec, as shown in FIG. 8). The exemplary SS block includes a PSS 910, an SSS 912, and two PBCHs 920 and 922, although the disclosure is not so limited, and an SS block may include more or fewer synchronization signals and synchronization channels. As illustrated, a transmission bandwidth (B1) of the PBCHs may be different from a transmission bandwidth (B2) of the synchronization signals. For example, the transmission bandwidth of the PBCHs may be 288 tones, while the transmission bandwidth of the PSS and SSS may be 127 tones.

As shown in FIG. 9, SS block consists of PSS, SSS and PBCH (and DMRS for PBCH). These signals are multiplexed in time-domain. As an alternative, or in addition, such signals could be multiplexed in the frequency-domain. There are different synchronization modes: initial acquisition in standalone, initial acquisition in non-standalone, and Synchronization in idle or connected modes.

As will be described herein, these different synchronization modes may have different PBCH TTI and PBCH transmission periodicities. As a result, different SFN bits may change within a TTI, presenting a challenge to maintain same content in each redundancy version.

Example Configuration of Remaining MSIB Window

As noted above, in an SS block, the SS may be transmitted in different directions. In some systems (e.g., LTE systems), system information (SI) transmissions, such as master system information block (MSIB) transmissions, may be transmitted in a fixed location with a fixed periodicity. In some cases, there may be a fixed mapping between SS block locations and corresponding remaining minimum system information (RMSI) transmissions with different periodicities. While a minimum amount of system information is carried on PBCH, RMSI generally refers to the rest of the system information (RMSI) carried on PDSCH.

While these approaches allow a UE (that detects SS) to know where (what time and frequency resources) to monitor for MSIB transmissions, in a multi-beam scenario, this fixed location and/or fixed periodicity may limit flexibility of the base station (gNB) in terms of scheduling capability.

Aspects of the present disclosure, however, allow a gNB to provide configuration of a search window for transmitting remaining MSIB that correspond to different SS block indices. This approach may provide more flexibility to the gNB, while still allowing a UE to readily determine where to monitor for remaining MSIB transmissions.

Figure 10:
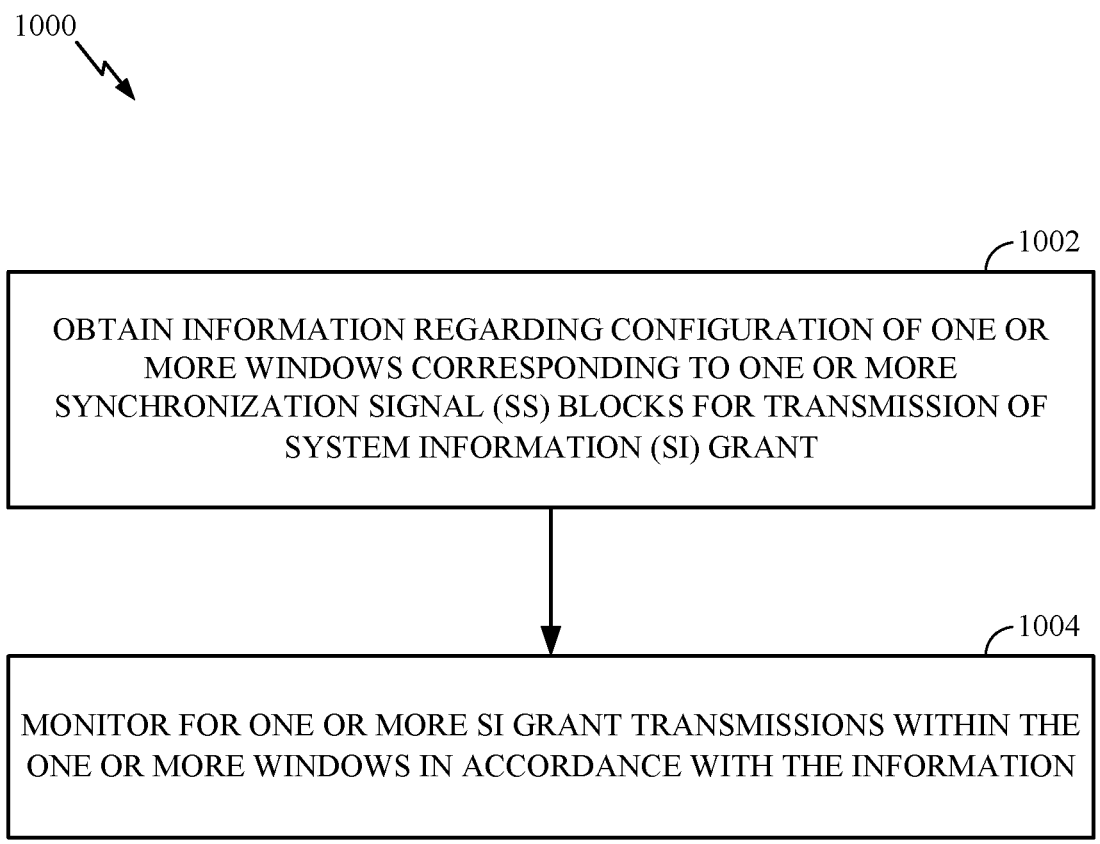
FIG. 10 illustrates example operations that may be performed by a user equipment (UE), in accordance with certain aspects of the present disclosure.

FIG. 10 illustrates example operations 1000 that may be performed by a user equipment (UE), in accordance with certain aspects of the present disclosure.

Operations 1000 begin, at 1002, by obtaining information regarding configuration of one or more windows corresponding to one or more synchronization signal (SS) blocks for transmission of system information (SI) grant. At 1004, the UE monitors for one or more SI grant transmissions within the one or more windows in accordance with the information.

Figure 11:
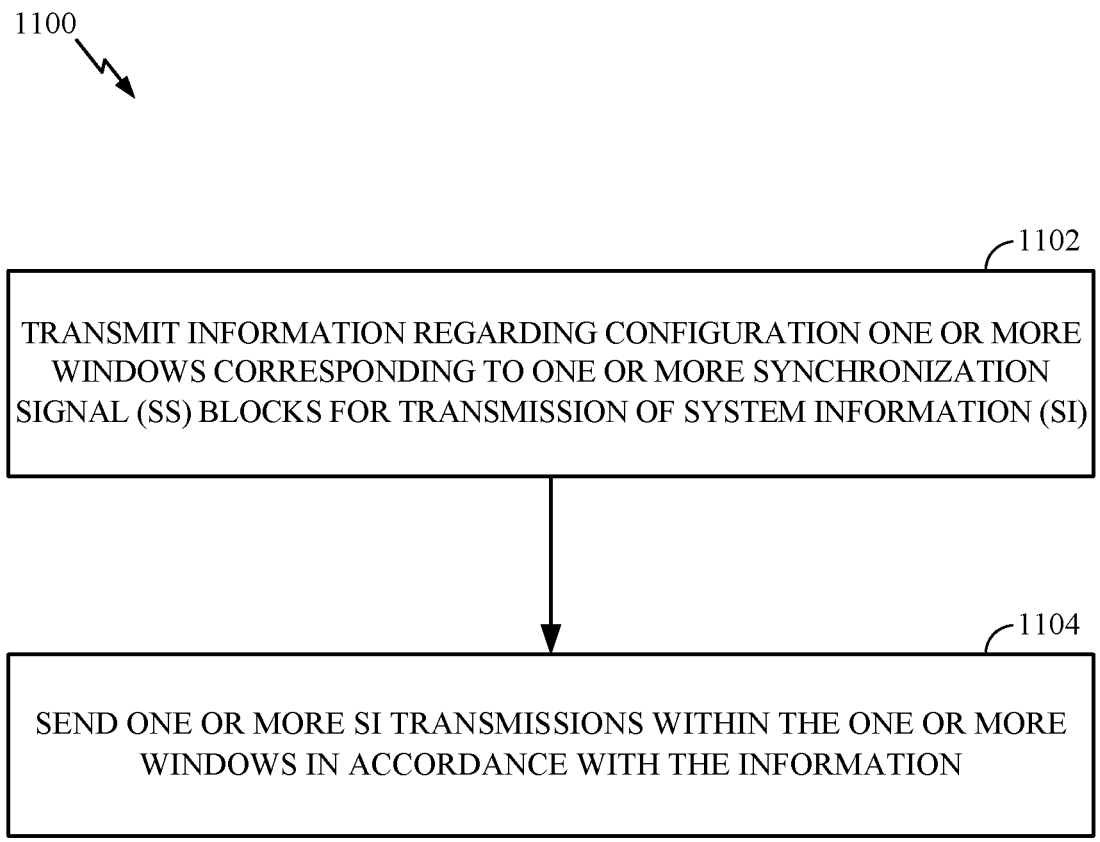
FIG. 11 illustrates example operations that may be performed by a network entity, in accordance with certain aspects of the present disclosure.

FIG. 11 illustrates example operations 1100 that may be performed by a network entity (e.g., a base station, such as a gNB) to configure an SI grant transmission window and convey the configuration to a UE, in accordance with certain aspects of the present disclosure.

Operations 1100 begin, at 1102, by transmitting information regarding configuration one or more windows corresponding to one or more synchronization signal (SS) blocks for transmission of system information (SI). At 1104, the base station sends one or more SI transmissions within the one or more windows in accordance with the information.

Figure 12:
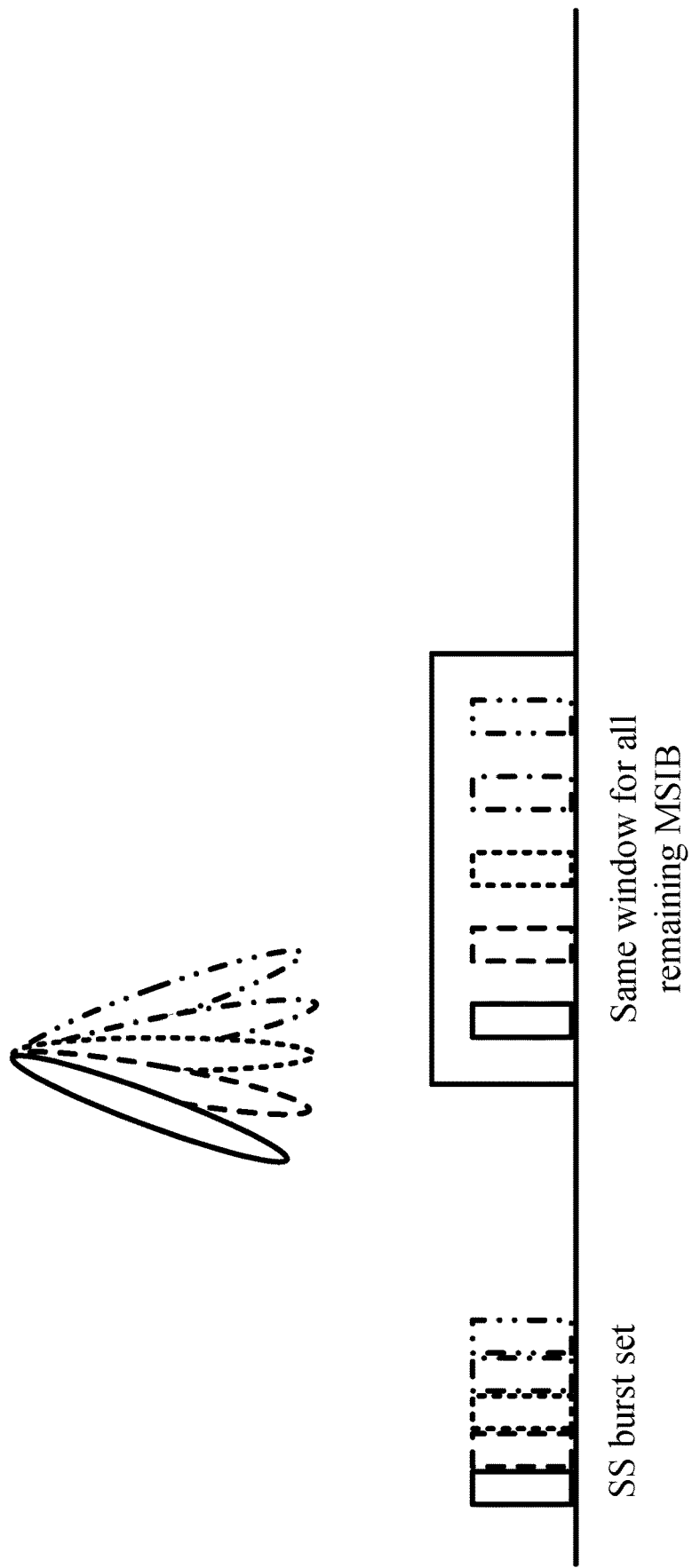
FIGS. 12-14 illustrate example timelines of system information transmission windows, in accordance with certain aspects of the present disclosure.
Figure 13:
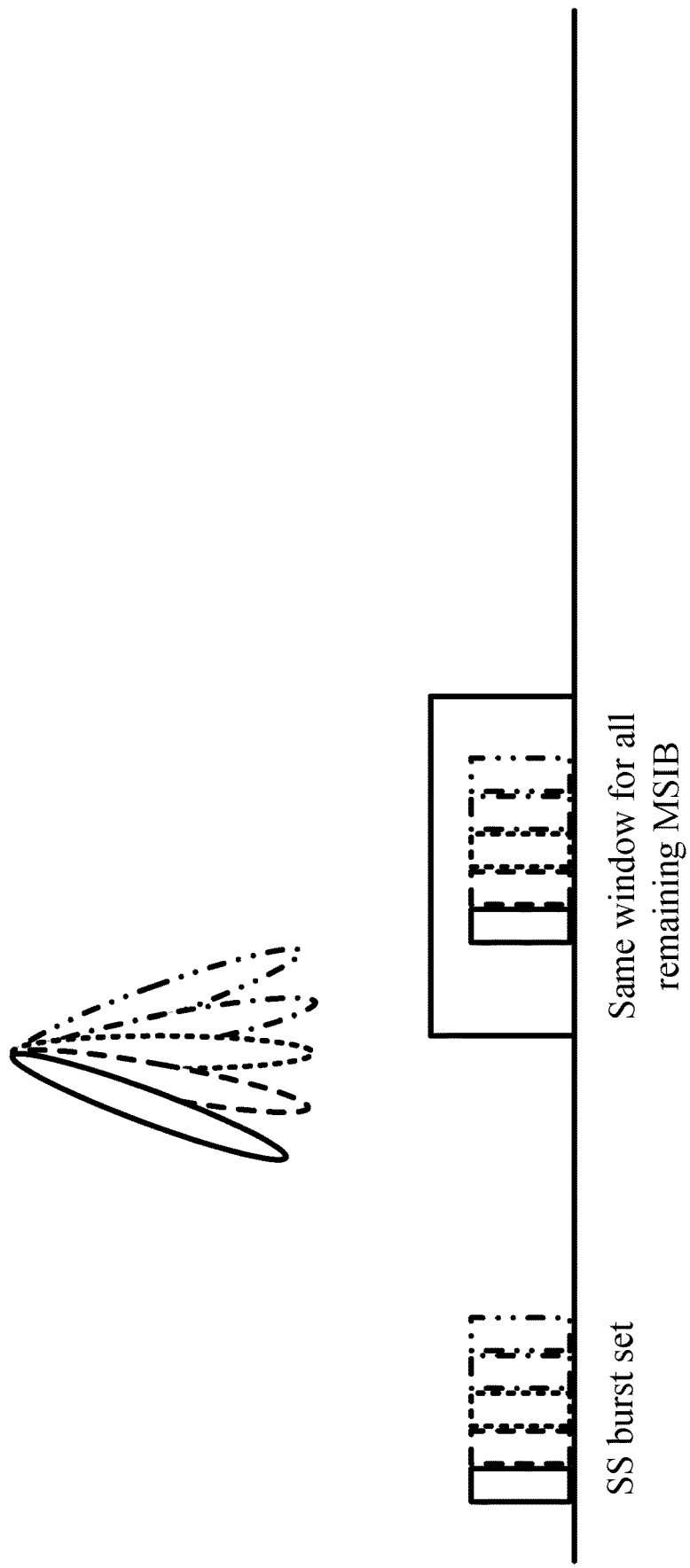
Figure 14:
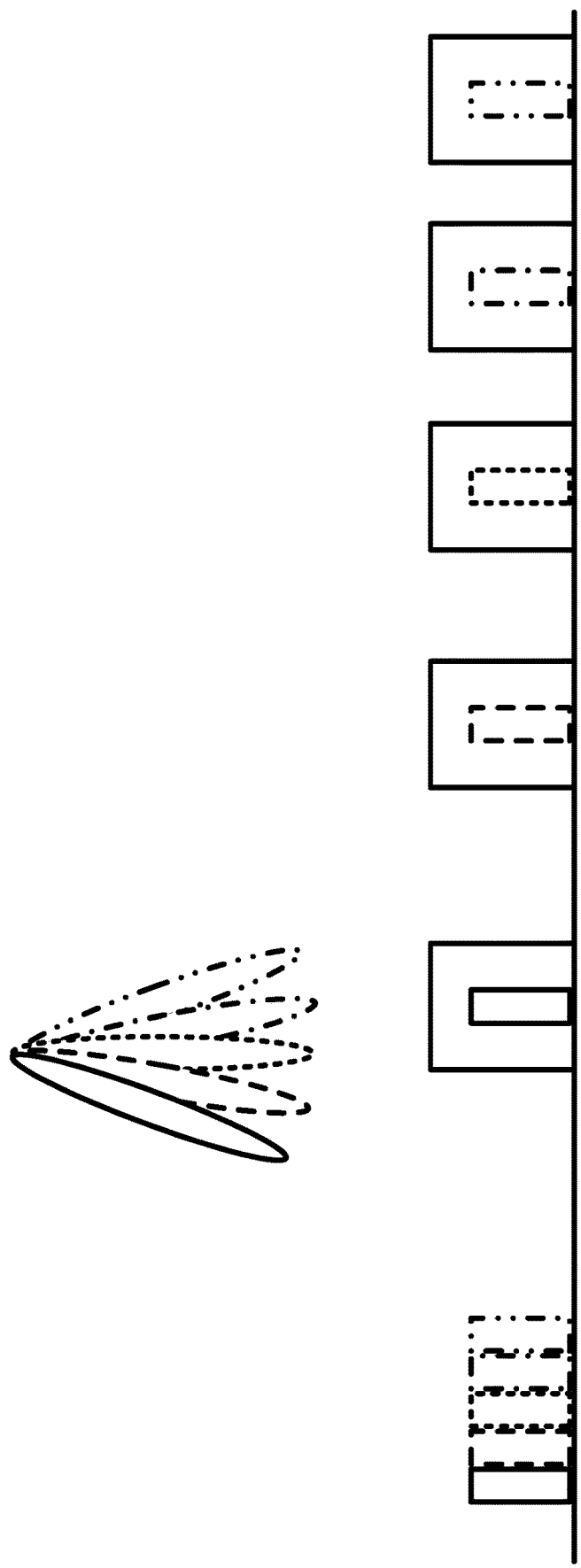

FIGS. 12-14 illustrate example timelines of various system information transmission window configurations, in accordance with certain aspects of the present disclosure.

For example, FIG. 12 illustrates an example of a same window with all remaining MSIB transmissions. As indicated, each MSIB transmission may be sent with a different beam (corresponding to beams used to send SS blocks in an SS burst set). As described above, each SS block may consist of one or more combinations of PSS, SSS, PBCH, TSS and DMRS signals. In some cases, the PBCH may provide configuration information for the same window for transmitting remaining MSIB of all SS blocks within the SS burst set.

As illustrated in the example of FIG. 12 the remaining MSIB transmissions may be distributed within the window. As an alternative, as illustrated in FIG. 13, the remaining MSIB blocks may be transmitted consecutively (e.g. in consecutive slots).

As illustrated in FIG. 14, in some cases, a configuration (e.g., conveyed via PBCH) may provide different windows for transmitting remaining MSIB of different SS blocks within the SS burst set. Given this information, once a UE learns of a beam index (from SS detection), it may know the corresponding window to monitor for the corresponding MSIB transmission. In some cases, the configuration may include an offset of remaining minimum system information (RMSI) blocks with respect to the SS blocks.

In some cases, a mixture of the scenarios shown in FIGS. 12-14 may be used. For example, PBCH may indicate multiple windows, and each window may have one or multiple MSIB transmissions, which may enhance scheduling flexibility.

There may be a relationship between MSIB periodicity and window duration. For example, if MSIB is occurring more frequently, the window duration can be shorter. On the other hand, if MSIB is occurring less frequently, the window duration can be longer. Additionally, in some cases, the configuration may convey a periodicity of system information, such as the plurality of SI grant transmissions. In some cases, the periodicity of the system information is the same as a periodicity of synchronization signals.

In some cases, a number of SS blocks within an SS burst Set may be indicated to the UE. For example, a gNB may be allowed to transmit at most L SS blocks in an SS burst set as follows:

L can be [64] for over-6 GHz
L can be [1, 2, 4] for 0-3 GHz
L can be [4, 8] for 3-6 GHz The actual number of SS blocks within an SS burst set is implementation specific and may be signaled by gNB. In some cases, the gNB may jointly inform the UE about the number of SS blocks and the window duration for remaining MSIB.

There may be a relationship between the number of blocks and the window duration. For example, the relationship may be the higher the number of SS blocks, the longer the window duration for remaining MSIB, the lower the number of SS blocks, the shorter the window duration for remaining MSIB.

Given the SI window information provided (e.g., via PBCH), the UE may know the window to monitor for remaining MSIB. Exactly how the information is signaled may depend on the exact scenario. For example, two bits of information may signal one of a set of different window options (e.g., with a window defined by start time/end times).

A UE may tailor how it monitors for SI given this information. For example, a UE may attempt to decode PDCCH only within the window which may reduce power consumption. In some cases, the UE may go direction to a particular slot (e.g., given a beam index).

In any case, the UE may attempt to decode PDCCH in each possible slot. For example, if there are 20 slots within a window and 3 options for PDCCH within a slot (e.g., within any of the first three symbols), the PDCCH may attempt to decode 60 locations.

The PDCCH may provide scheduling information for remaining MSIB. For example, the PDCCH may indicate the particular resource blocks where the MSIB information is transmitted. In some cases, a gNB sending SI sends a PDCCH that schedules a physical downlink shared channel PDSCH of one or more SI channels.

In some cases, the actually transmitted SS blocks may be indicated in RMSI or other SI (OSI) for both sub-6 GHz and over-6 GHz cases. The indication may be in a compressed form in over-6 GHz cases. For indication in RMSI, various alternatives are available. In one alternative, a Group-Bitmap field (e.g., 8 bits) and a Bitmap in Group field (e.g., 8 bits) may be used. A Group may be defined as consecutive SS/PBCH blocks. The Bitmap in a Group field can indicate which SS/PBCH block is actually transmitted within a Group, where each Group has the same pattern of SS/PBCH block transmissions, and the Group-Bitmap field can indicate which Group is actually transmitted.

Figure 15:
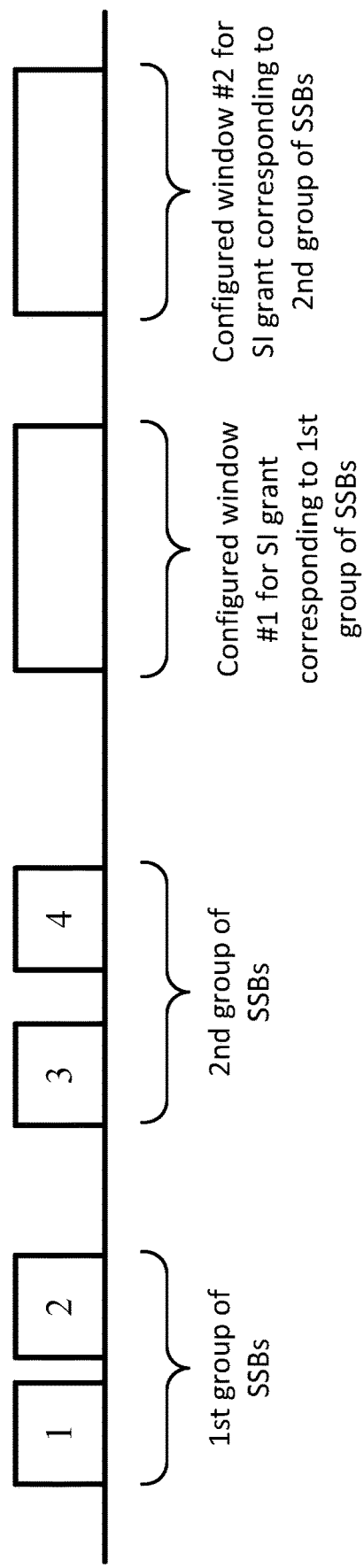
FIG. 15 illustrates an example timeline, in accordance with certain aspects of the present disclosure.

FIG. 15 illustrates different groups, in particular, first and second groups of SSBs. As illustrated, a first window (window #1) may be configured for SI grant corresponding to the first group of SSBs, while a second window (window #2) may be configured for SI grant corresponding to the second group of SSBs.

If a UE detects any SSB within the 1st group of SSBs, it searches for an RMSI grant corresponding to that SSB in all control symbols of the configured window #1. If the UE detects any SSB within the 2nd group of SSBs, it searches for an RMSI grant corresponding to that SSB in all control symbols of the configured window #2.

For other system information (OSI) grants, the number of configured windows may be, for example, eight. In some cases, there may be eight groups of SSBs and the actually transmitted SSBs in each of these eight groups may be conveyed via RMSI. The configured window for the OSI grant/DCI can be different among these eight groups.

As described herein, providing configuration information for an SI transmission window may provide flexibility in scheduling to a base station. As noted above, providing this configuration information may also allow a UE to reduce power by knowing the window within which the UE should monitor for remaining SI transmissions.

In some cases, similar advantages may be obtained by providing configuration information for a window for transmission of paging downlink control information (DCI) or paging messages. In other words, this information may provide flexibility in scheduling to a base station, and may also allow a UE to reduce power by knowing the window within which the UE should monitor for the paging DCI or paging messages.

Figure 16:
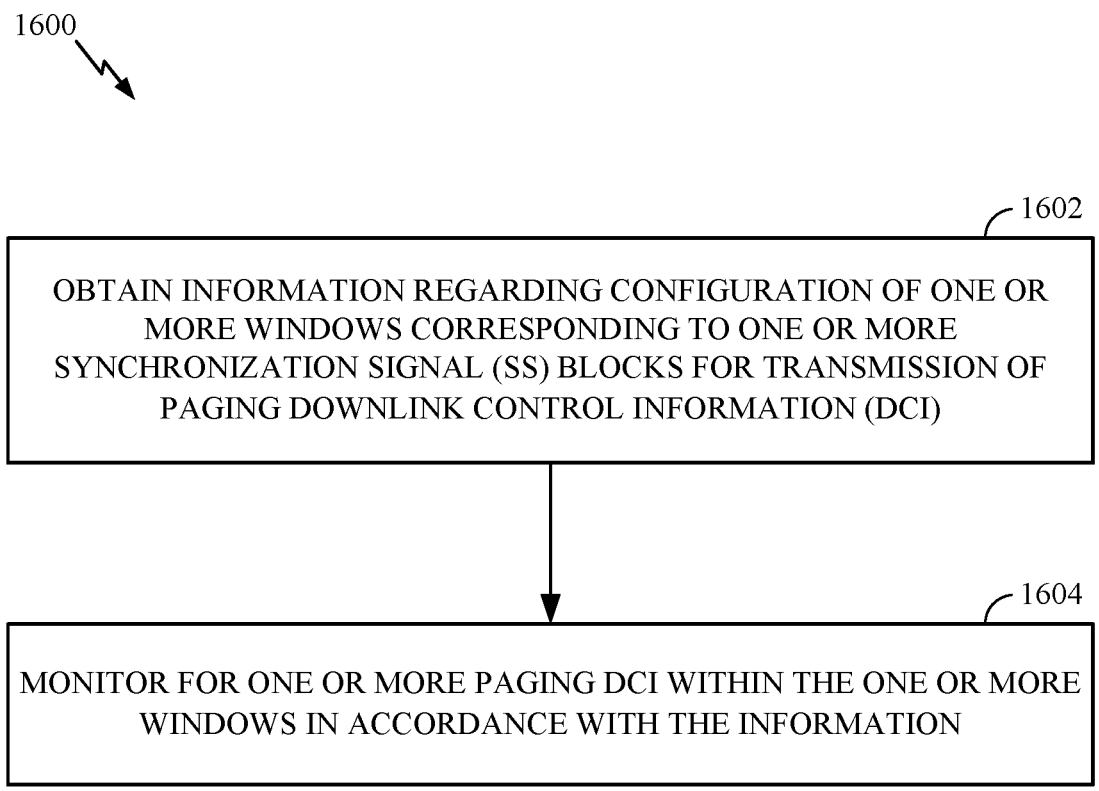
FIG. 16 illustrates example operations that may be performed by a user equipment (UE), in accordance with certain aspects of the present disclosure.

FIG. 16 illustrates example operations 1600 that may be performed by a user equipment (UE), in accordance with certain aspects of the present disclosure.

Operations 1600 begin, at 1602, by obtaining information regarding configuration of one or more windows corresponding to one or more synchronization signal (SS) blocks for transmission of paging downlink control information (DCI). At 1604, the UE monitors for one or more paging DCI within the one or more windows in accordance with the information.

Figure 17:
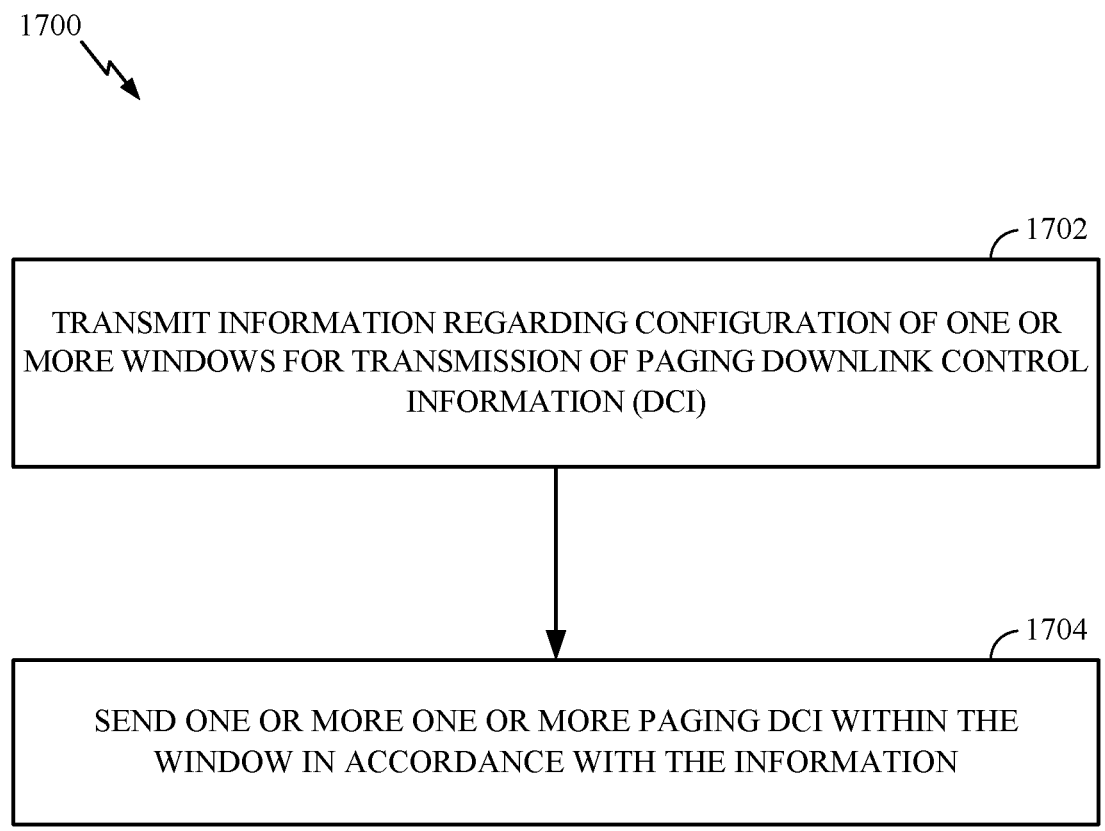
FIG. 17 illustrates example operations that may be performed by a network entity, in accordance with certain aspects of the present disclosure.

FIG. 17 illustrates example operations 1700 that may be performed by a network entity (e.g., a base station, such as a gNB) to configure an SI transmission window and convey the configuration to a UE, in accordance with certain aspects of the present disclosure.

Operations 1700 begin, at 1702, by transmitting information regarding configuration of one or more windows for transmission of paging downlink control information (DCI). At 1704, the base station sends one or more one or more paging DCI within the window in accordance with the information.

In some cases, at least a portion of the configuration may be defined by a standard specification. In such cases, the base station conveys the configuration of the window for transmission of paging DCI (and SI grant transmissions), for example, (via a master information block (MIB) or via a remaining minimum SI (RMSI), other system information (OSI), RRC signaling, MAC-CE based signaling, or a handover command or message. In some cases, the configuration may also implicitly convey a number of synchronization signal (SS) blocks in an SS burst set and may also convey a periodicity of the paging DCI/message transmission.

In some cases, the paging DCIs may be conveyed consecutively, but shifted (offset) from synchronization signal (SS) blocks in an SS burst set. The paging DCI/message window corresponding to all synchronization signal (SS) blocks in an SS burst set may be the same. The paging DCI/message and/or SI grant configuration window may vary for different synchronization signal (SS) blocks in an SS burst set. In some cases, the duration of the window for paging DCI/SI grant transmissions equals the duration of the paging DCI/SI grant transmission. In such cases, the UE may monitor for only one slot within the window to search for paging DCI/SI grant transmission in accordance with the information. In some cases, the UE determines a monitoring window for the paging DCI based on a declaration of (information that declares) a paging occasion.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a user equipment (UE), comprising:

obtaining a signal comprising configuration information for a plurality of windows for transmission of one or more system information (SI) grant transmissions, wherein:
  each SI grant transmission of the one or more SI grant transmissions corresponds to a different synchronization signal (SS) block of a plurality of SS blocks;
  each different SS block of the plurality of SS blocks corresponds to a different window of the plurality of windows;
  each SS block of the plurality of SS blocks is associated with a different transmission beam of a plurality of transmission beams;
  the configuration information provides an indication of a beam index of a transmission beam of the plurality of transmission beams associated with at least one SI grant transmission of the one or more SI grant transmissions; and
  the one or more SI grant transmissions comprise remaining minimum system information (RMSI) block grant transmissions; and
monitoring for the one or more SI grant transmissions within one or more windows of the plurality of windows in accordance with the configuration information, wherein:
  the monitoring for the one or more SI grant transmissions within the one or more windows of the plurality of windows comprises:
    determining a first window of the plurality of windows to monitor for the at least one SI grant transmission based on the beam index; and
    monitoring for the at least one SI grant transmission in the determined first window.

2. The method of claim 1, wherein the monitoring comprises monitoring for a physical downlink control channel (PDCCH) that schedules a physical downlink shared channel (PDSCH) of one or more SI channels to receive system information.

3. The method of claim 1, wherein at least a portion of the configuration information is defined by a standard specification.

4. The method of claim 1, wherein obtaining the configuration information comprises obtaining the configuration information from a network entity via a master information block (MIB), a remaining minimum SI (RMSI) block, or a handover command.

5. The method of claim 1, wherein the one or more SI grant transmissions further comprise other system information (OSI) grant transmissions.

6. The method of claim 1, wherein the configuration information further conveys a number of SS blocks in an SS burst set corresponding to the plurality of SS blocks.

7. The method of claim 1, wherein the configuration information further conveys a periodicity of system information.

8. The method of claim 7, wherein the periodicity of the system information is the same as a periodicity of synchronization signals.

9. The method of claim 1, wherein the s are conveyed consecutively but shifted from SS blocks in the plurality of SS blocks.

10. The method of claim 1, wherein the configuration information further includes an offset for the RMSI block grant transmissions with respect to the plurality of SS blocks.

11. The method of claim 1, wherein at least one window of the plurality of windows is the same for multiple SS blocks of the plurality of SS blocks.

12. The method of claim 1, wherein the plurality of windows vary for different SS blocks of the plurality of SS blocks.

13. The method of claim 1, wherein:
  a duration of one or more windows of the plurality of windows, corresponding to each SS block of the plurality of SS blocks, equals a duration of the one or more SI grant transmissions.

14. The method of claim 1, wherein monitoring comprises monitoring for only one slot within one or more windows of the plurality of windows in accordance with the configuration information.

15. The method of claim 1, wherein each SS block of the plurality of SS block includes at least a primary synchronization signal (PSS), a secondary synchronization signal (SSS), and physical broadcast channel (PBCH) information.

16. The method of claim 1, wherein the signal comprises a physical broadcast channel (PBCH).

17. A method of wireless communications by a network entity, comprising:
  transmitting a signal comprising configuration information for a plurality of windows for transmission of one or more system information (SI) grant transmissions, wherein:
    each SI grant transmission of the one or more SI grant transmissions corresponds to a different synchronization signal (SS) block of a plurality of SS blocks;
    each different SS block of the plurality of SS blocks corresponds to a different window of the plurality of windows;
    each SS block of the plurality of SS blocks is associated with a different transmission beam of a plurality of transmission beams;
    the configuration information provides an indication of a beam index of a transmission beam of the plurality of transmission beams associated with at least one SI grant transmission of the one or more SI grant transmissions; and
    the one or more SI grant transmissions comprise remaining minimum system information (RMSI) block grant transmissions; and
  sending the one or more SI grant transmissions within the plurality of windows in accordance with the configuration information, wherein:
    the sending for the one or more SI grant transmissions within the plurality of windows comprises:
      determining a first window of the plurality of windows to send at least one SI grant transmission based on the beam index; and
      sending the at least one SI grant transmission in the determined first window.

18. The method of claim 17, wherein the sending comprises sending a physical downlink control channel (PDCCH) that schedules a physical downlink shared channel (PDSCH) of one or more SI channels to receive system information.

19. The method of claim 17, wherein at least a portion of the configuration information is defined by a standard specification.

20. The method of claim 17, wherein transmitting the configuration information comprises transmitting the configuration information via a master information block (MIB), a remaining minimum SI (RMSI) block, or a handover command.

21. The method of claim 17, wherein the one or more SI grant transmissions further comprise other system information (OSI) grant transmissions.

22. The method of claim 17, wherein the configuration information further conveys a number of SS blocks in the plurality of SS blocks.

23. The method of claim 17, wherein the configuration information further conveys a periodicity of system information.

24. The method of claim 23, wherein the periodicity of the system information is the same as a periodicity of synchronization signals.

25. The method of claim 17, wherein the RMSI block grant transmissions that are conveyed consecutively but shifted from SS blocks in the plurality of SS blocks.

26. The method of claim 17, wherein the configuration information includes an offset for the RMSI block grant transmissions with respect to the plurality of SS blocks.

27. The method of claim 17, wherein at least one window of the plurality of windows is the same for multiple SS blocks of the plurality of SS blocks.

28. The method of claim 17, wherein the plurality of windows vary for different SS blocks of the plurality of SS blocks.

29. The method of claim 17, wherein:
a duration of one or more windows of the plurality of windows, corresponding to each SS block of the plurality of SS blocks, equals the duration of the one or more SI grant transmissions.

30. A method of wireless communications by a user equipment (UE), comprising:
obtaining a signal comprising configuration information for a plurality of windows for transmission of one or more paging downlink control information (DCI) transmissions, wherein:
each paging DCI transmission of the one or more paging DCI transmissions corresponds to a different synchronization signal (SS) block of a plurality of SS blocks;
each different SS block of the plurality of SS blocks corresponds to a different window of the plurality of windows;
each paging DCI transmission of the one or more paging DCI transmissions is associated with a different transmission beam of a plurality of transmission beams;
the configuration information provides an indication of a beam index of a transmission beam of the plurality of transmission beams associated with at least one paging DCI transmission of the one or more paging DCI transmissions; and
the configuration information is obtained in a remaining minimum SI (RMSI) block; and
monitoring for the one or more paging DCI transmissions within one or more windows of the plurality of windows in accordance with the configuration information, wherein:
the monitoring for the one or more paging DCI transmissions within the one or more windows of the plurality of windows comprises:
determining a first window of the plurality of windows to monitor for the at least one paging DCI transmission based on the beam index; and
monitoring for the at least one paging DCI transmission in the determined first window.

31. The method of claim 30, further comprising determining a monitoring window for monitoring for the one or more paging DCI transmissions based on a declaration of a paging occasion.

32. The method of claim 30, wherein a portion of the configuration information is defined by a standard specification.

33. The method of claim 30, wherein a network entity further conveys the configuration information via at least one of a master information block (MIB), other system information (OSI), radio resource control (RRC) signaling, media access control element (MAC-CE) based signaling, or a handover message.

34. The method of claim 30, wherein:
the configuration information further conveys a periodicity of the one or more paging DCI transmissions.

35. The method of claim 30, wherein the configuration information includes an offset for the one or more paging DCI transmissions with respect to the plurality of SS blocks.

36. The method of claim 30, wherein the one or more paging DCI transmissions are conveyed consecutively but shifted from SS blocks in the plurality of SS blocks.

37. The method of claim 30, wherein at least one window of the plurality of windows is the same for multiple SS blocks of the plurality of SS blocks.

38. The method of claim 30, wherein the plurality of windows vary for different SS blocks of the plurality of SS blocks.

39. The method of claim 30, wherein:
a duration of one or more windows of the plurality of windows for monitoring for the one or more paging DCI transmissions equals a duration of the one or more paging DCI transmissions; and
monitoring comprises monitoring for only one slot within a paging period to search for the one or more paging DCI transmissions in accordance with the configuration information.

40. A method of wireless communications by a network entity, comprising:
transmitting a signal comprising configuration information for a plurality of windows for transmission of one or more paging downlink control information (DCI) transmissions, wherein:
each paging DCI transmission of the one or more paging DCI transmissions corresponds to a different synchronization signal (SS) block of a plurality of SS blocks;
each different SS block of the plurality of SS blocks corresponds to a different window of the plurality of windows;
each paging DCI transmission of the one or more paging DCI transmissions is associated with a different transmission beam of a plurality of transmission beams;
the configuration information provides an indication of a beam index of a transmission beam of the plurality of transmission beams associated with at least one paging DCI transmission of the one or more paging DCI transmissions; and
transmitting the configuration information comprises transmitting the configuration information via a remaining minimum SI (RMSI) block; and
sending the one or more paging DCI transmissions within the plurality of windows in accordance with the configuration information, wherein:

the sending the one or more paging DCI transmissions within the one or more windows of the plurality of windows comprises:

determining a first window of the plurality of windows to send the at least one paging DCI transmission based on the beam index; and sending the at least one paging DCI transmission in the determined first window.

41. The method of claim 40, further comprising declaring a monitoring window for the one or more paging DCI transmissions as a paging occasion.

42. The method of claim 40, wherein a portion of the configuration information is defined by a standard specification.

43. The method of claim 40, wherein transmitting the configuration information further comprises transmitting the configuration information via at least one of a master information block (MIB), radio resource control (RRC) signaling, media access control control element (MAC-CE) based signaling, or a handover message.

44. The method of claim 40, wherein:

the configuration information further conveys a periodicity of the one or more paging DCI transmissions.

45. The method of claim 40, wherein the configuration information includes an offset for the one or more paging DCI transmissions with respect to the plurality of SS blocks.

46. The method of claim 40, wherein the one or more paging DCI transmissions are conveyed consecutively but shifted from SS blocks in the plurality of SS blocks.

47. The method of claim 40, wherein at least one window of the plurality of windows is the same for multiple SS blocks in the plurality of SS blocks.

48. The method of claim 40, wherein the plurality of windows vary for different SS blocks of the plurality of SS blocks.

49. The method of claim 40, wherein:

a duration of one or more windows of the plurality of windows for monitoring for the one or more paging DCI transmissions equals a duration of the one or more of paging DCI transmissions.

* * * * *